United States Patent
Veprinsky et al.

(10) Patent No.: US 9,524,218 B1
(45) Date of Patent: Dec. 20, 2016

(54) LEVERAGE FAST VP EXTENT-LEVEL STATISTICS WITHIN CDP ENVIRONMENTS

(71) Applicant: EMC Corporation, Hopkinton, MA (US)

(72) Inventors: Alexandr Veprinsky, Brookline, MA (US); Assaf Natanzon, Tel Aviv (IL); Saar Cohen, Moshav Mishmeret (IL); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 432 days.

(21) Appl. No.: 14/021,488

(22) Filed: Sep. 9, 2013

(51) Int. Cl.
*G06F 11/14* (2006.01)
*G06F 17/30* (2006.01)

(52) U.S. Cl.
CPC ........ *G06F 11/1469* (2013.01); *G06F 11/1471* (2013.01); *G06F 17/30286* (2013.01); *G06F 17/30292* (2013.01)

(58) Field of Classification Search
USPC .......................................................... 714/19
See application file for complete search history.

(56) References Cited

U.S. PATENT DOCUMENTS

| | | | |
|---|---|---|---|
| 8,433,848 B1* | 4/2013 | Naamad et al. ............... | 711/114 |
| 8,539,124 B1* | 9/2013 | Burke .............................. | 710/74 |
| 2006/0230244 A1* | 10/2006 | Amarendran et al. ......... | 711/162 |
| 2009/0024813 A1* | 1/2009 | Uysal et al. .................... | 711/162 |
| 2009/0031097 A1* | 1/2009 | Nelson ............................ | 711/162 |
| 2010/0281230 A1* | 11/2010 | Rabii et al. ..................... | 711/165 |
| 2011/0197046 A1* | 8/2011 | Chiu et al. ...................... | 711/171 |
| 2012/0260040 A1* | 10/2012 | Mallge et al. .................. | 711/117 |
| 2014/0032959 A1* | 1/2014 | Dawkins et al. .............. | 714/6.3 |
| 2014/0281301 A1* | 9/2014 | Reinoso et al. ............... | 711/161 |
| 2015/0039837 A1* | 2/2015 | Quan et al. ..................... | 711/136 |

* cited by examiner

*Primary Examiner* — Kamini Patel
(74) *Attorney, Agent, or Firm* — Anderson Gorecki LLP

(57) ABSTRACT

A replica site is restored to a selected point in time by determining data state at the selected point in time, writing data indicative of that data state to the replica site storage array, and moving extents of the data written to the replica site storage array to selected tiers in order to achieve a predetermined level of performance. A journal of statistical meta data indicative of IO activity may be used to select the tiers.

20 Claims, 4 Drawing Sheets

Data Journal 200b

| IO D | IO D | IO D | IO D | IO D | IO D | IO D | IO D | ... |

*Figure 2*

Meta Data Journal 300b

| IO MD | IO MD | ... | STAT MD | IO MD | IO MD | ... | STAT MD | ... |

*Figure 3*

LEVERAGE FAST VP EXTENT-LEVEL STATISTICS WITHIN CDP ENVIRONMENTS

CROSS-REFERENCE TO RELATED APPLICATIONS

NA

BACKGROUND OF THE INVENTION

Aspects of the disclosure are generally related to data storage subsystems which are accessed via a network, and more particularly restoring data at a replica site.

Computer data is vital to the operations of many organizations. Consequently, systems have been developed to maintain and protect data sets. Enterprise data storage arrays, for example, are used to maintain relatively large data sets. An enterprise data storage subsystem includes at least one enterprise storage array which is accessed via a host device. The storage array typically includes multiple physical storage devices. Technologies such as RAID and remote site mirroring may be used to help maintain availability and avoid data loss. Further, tiered levels of storage may be utilized in order to help provide both high performance and high capacity at a practical cost. Applications and devices generally access data in the storage array by sending IOs to the host device. The host device communicates with the storage array to Read or Write the corresponding data. If storage resources are organized in hierarchical tiers, data may be automatically moved between storage tiers based on IO activity. For example, data may be automatically moved to a lower storage tier of less costly media with slower access time after not being accessed for some period of time, or to a higher storage tier of more costly media with faster access time after being accessed.

SUMMARY OF THE INVENTION

In accordance with an aspect, a method comprises: in a mirrored storage system including a production site with a tiered storage array and a backup site with a tiered storage array, restoring the backup site to a selected point in time by determining data state at the selected point in time, writing data indicative of that data state to the backup site storage array, and notifying storage to move extents of the data written to the backup site storage array to selected tiers in order to achieve a predetermined level of performance by updating the extents IO stats at the backup storage.

In accordance with another aspect, a computer program stored on a non-transitory computer readable medium comprises: in a mirrored storage system including a production site with a tiered storage array and a backup site with a tiered storage array, logic which restores the backup site to a selected point in time by determining data state at the selected point in time, writing data indicative of that data state to the backup site storage array, and moving extents of the data written to the backup site storage array to selected tiers in order to achieve a predetermined level of performance.

In accordance with another aspect, an apparatus comprises: a production site with a host and a tiered storage array; and a backup site with a host and a tiered storage array, the backup site being restored to a selected point in time by logic which determines data state at the selected point in time, writes data indicative of that data state to the backup site storage array, and moves extents of the data written to the backup site storage array to selected tiers in order to achieve a predetermined level of performance.

Some aspects advantageously enable restoration to include restoration of both data state and data performance. Performance levels are a function of storage tiering. Backup site data is automatically moved between tiers over time based on IO activity and hints. Journaling of statistical meta data indicative of IO activity provides an historical record of IO activity. That record can be used to restore tiering, and thus performance, to a selected previous point in time.

Other features and advantages will become apparent in view of the detailed description and figures.

BRIEF DESCRIPTION OF THE FIGURES

FIG. 2 illustrates a data journal.
FIG. 3 illustrates a meta data journal.

DETAILED DESCRIPTION

Definitions

Figure 1:
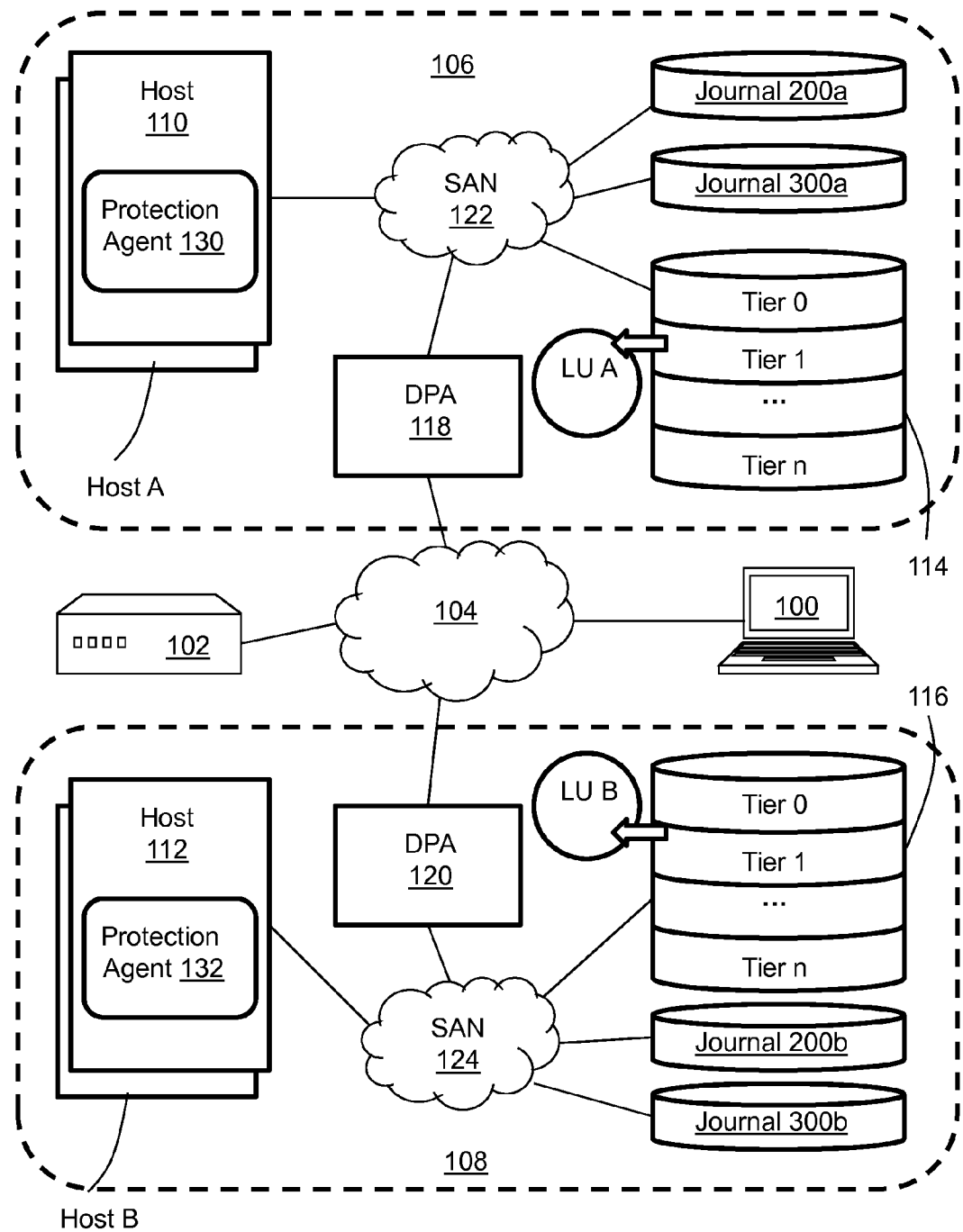
FIG. 1 illustrates a simplified network environment in which data storage is tiered and mirrored, and in which tiering and data state can be restored to a previous point in time.

BACKUP SITE—a.k.a. replica site; a facility where replicated production site data is stored; the backup site may be located in a remote site at a different geographical location or at the same geographical location as the production site;

BOOKMARK—metadata information stored in a replication journal which indicates storage array state at a point in time;

Data Protection Appliance (DPA)—a computer or cluster of computers responsible for data protection services including inter alia data replication of a storage system, and journaling of I/O requests issued by a host computer to the storage system;

HOST—a computer, cluster of computers or network of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O request—an input/output request (sometimes referred to as an I/O), which may be a Read I/O request (sometimes referred to as a Read request or a Read) or a Write I/O request (sometimes referred to as a Write request or a Write);

JOURNAL—a record of Write transactions issued to a storage system; used to maintain a duplicate storage system, and to roll back the state of a duplicate storage system to a previous point in time;

LOGICAL UNIT—a logical entity provided by a storage system for accessing data from the storage system. The logical unit may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that Write data to a storage system and Read data from the storage system;

REMOTE ACKNOWLEDGEMENTS—an acknowledgement from a remote DPA to a local DPA indicating that data has arrived at the remote DPA (either to the appliance or the journal)

SPLITTER ACKNOWLEDGEMENT—an acknowledgement from a DPA to a protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

FIG. 1 illustrates a simplified network environment in which applications running on computer devices such as a user terminal 100 and a server 102 utilize a network 104 to access data maintained by a production site data storage subsystem 106. A backup (replica) site storage subsystem 108 provides failover and restore capabilities. Each storage subsystem 106, 108 includes a respective host 110, 112, storage array 114, 116, and DPA 118, 120 in communication via a respective SAN 122, 124. Each SAN may include various switching devices. The host typically runs at least one data processing application such as a database application or an e-mail server. The applications on the computer devices can prompt an IO request by signaling to the production site host 110. The production site host responds by signaling to the production site storage array 114 in a format that can be processed by that storage array. For example, if the production site host receives a message from the application which prompts a Read request for a set of data, the host 110 may generate a small computer system interface (SCSI) Read request and send that Read request to the production site storage array 114. The production site storage array then provides the data associated with the Read request to the production site host, and the production site host device returns the data to the application which signaled to the host.

The storage arrays 114, 116 are organized into different hierarchical tiers 0-n. A data storage system typically includes various logical data storage constructs, but data is ultimately stored on physical storage devices. Different types of physical storage devices have different performance characteristics and different costs. In a tiered storage system each tier is associated with a particular type of physical storage device. Physical storage devices which are capable of relatively faster response times are generally more costly than devices characterized by slower response times. The tiered storage system balances storage cost and storage performance by utilizing multiple types of storage devices and selectively storing data at the different tiers to achieve desired levels of system performance, cost and capacity. For example, the physical storage devices may include high-speed flash (EFD) arrays at tier 0, Fibre Channel arrays at tier 1, and SATA arrays at tier n. Tier 0 is used to store sets of data (extents) which are "hot." Each extent may be associated with a contiguous area of storage, and the highest ranked extents are selected for storage at tier 0 because it exhibits the best access time. Tier 1 is used to store extents which are "warm." In particular, the next-highest ranked (after tier 0) extents of storage are selected for storage at tier 1. The remaining extents are stored at a tier lower than tier 1. In general there will be greater storage capacity at tier 2 than at tier 1, and greater storage capacity at tier 1 than at tier 0, etc. The number of tiers, types of storage devices used at the tiers, and capacity of the tiers is selected to achieve a particular performance, capacity and cost profile at the system level. A wide variety of storage devices and numbers of tiers might be utilized, and the illustrated example is simplified for ease of understanding so it should not be viewed as limiting the invention.

Data storage tier selection is partly or completely automated. One aspect of selecting a tier at which to store a particular extent of data is activity. IO activity associated with an extent of data can prompt promotion of the extent to a higher tier. Conversely, lack of IO activity associated with an extent can prompt demotion of the extent to a lower tier. Analysis programs in the hosts 110, 112, DPAs 118, 120, storage arrays 114, 116, or elsewhere monitor data access (IO) activity statistics on a per-extent basis over time and prompt movement or copying of data between tiers based on those statistics. Another aspect of selecting a tier at which to store a particular extent of data is hinting. A hint includes information which is indicative of policy, anticipated activity/inactivity, or both. For example, a particular extent or type of data may be associated with a particular tier based on performance requirements, importance, or other policies. Further, calculations may be made to predict whether and when a particular extent of data is likely to be the subject of an IO. For example, the host may utilize statistical analysis algorithms to recognize data access patterns and prompt the storage array with a hint to promote certain data by moving or copying that data to a higher storage tier if the calculations indicate that the data will be accessed in the near future or at some particular time (e.g., week, day, hour, minute etc.).

The production site 106 is mirrored by the backup site 108. Generally, each device (node) at a site may be an "initiator," a "target," or both. An initiator node is a device that initiates IO requests to one or more other devices. A target node is a device that replies to IO requests sent by an initiator node. Storage arrays 114 and 116 are target nodes. Each storage array exposes multiple logical units (LUs), each of which is associated with a unique logical unit number (LUN). In the illustrated example storage array 114 exposes LU A and storage array 116 exposes LU B, where LU B is a copy (replica) of LU A. LU B may be configured so that its size and tier are the same as the size and tier of LU A. However, the size and tier need not be identical. Some LUs of storage system 116 may be used for purposes other than back up LUs of storage system 114. Further, there may be symmetric replication whereby some LUs of storage system 114 are used for replicating LUs of storage system 116, and some LUs of storage system 116 are used for replicating LUs of storage system 114. The operating system of a host device typically creates a logical host for each exposed LU. For example, host device 110 identifies LU A and generates a corresponding logical Host A through which it can access LU A. Similarly, host 112 identifies LU B and generates a corresponding logical Host B through which it can access LU B. In the course of continuous operation host 110 is an initiator that issues IO requests through Host A to LU A. Such requests generally include an address with a specific device identifier, an offset within the device, and a data size. Offsets are generally aligned to 512 byte blocks. The average size of a write operation issued by host computer 104 may be, for example, 10 kilobytes (KB); i.e., 20 blocks. For an IO rate of 50 megabytes (MB) per second, this corresponds to approximately 5000 write transactions per second.

Each site includes a respective protection agent 130, 132 (a.k.a. splitter). Although shown as being associated with the hosts, the protection agents include program code which may run on a storage array or elsewhere. The protection agents 130, 132 intercept IO commands issued by their respective host computers (via the logical hosts) to LUs. The intercepted IO commands may be processed by the protection agent according to any of various different procedural steps including: sending the IO command to its intended LU; redirecting the IO command to a different LU; splitting the IO command by sending it first to the respective DPA and then after the DPA returns an acknowledgement sending the IO command to its intended LU; failing the IO command by returning an error return code; and delaying the IO command by not returning an acknowledgement to the respective host computer. A protection agent may handle different IO commands differently based on associations of procedural steps with different types of commands. For example, an IO command inquiring about the size of a certain LU may be sent directly to that LU, whereas a Write command may be split and sent first to a DPA associated with the agent. A protection agent's procedures for handling IO commands may also be changed, for example, as a result of an instruction received from the DPA. The relationship of a protection agent relative to a certain host device generally corresponds to the relationship of its associated DPA with respect to the LU of the host device. When a DPA is a source site DPA for a certain LU then during the normal course of operation the associated protection agent splits IO requests issued by a host computer to the host device corresponding to that LU. Similarly, when a DPA is a target device for a certain LU then during the normal course of operation the associated protection agent fails IO requests issued by host computer to the host device corresponding to that LU. The protection agents and DPAs include program code which may run on the host, the storage array, a standalone device, a cluster of devices, or elsewhere.

Referring to FIGS. 1 through 3, the DPAs 118, 120 perform various data protection services including data replication which enables failover from the production site 106 to the backup site 108. The DPAs are configured to act as both initiators and targets. In normal non-restoration mode DPA 118 is a source site DPA for LU A and protection agent 130 is configured to act as a source side splitter for Host A. Specifically, protection agent 130 replicates SCSI IO requests. The replicated SCSI IO requests are sent to DPA 118. After receiving an acknowledgement from DPA 118, protection agent 130 then sends the SCSI IO request to LU A. After receiving a second acknowledgement from the storage system 114, host 110 acknowledges that the IO is complete. When DPA 118 receives a replicated SCSI request from data protection agent 130, DPA 118 transmits certain IO information characterizing the request, packaged as a "transaction," over network 104 to DPA 120 on the target side for journaling and eventual incorporation within target storage system 108. For example, Write IO data (IO D) is journaled in data journal 200*b* and IO meta data (IO MD) associated with Write operations is journaled in meta data journal 300*b*. Replication is accomplished by writing data associated with IO Writes from the data journal 200*b* to the storage array 116. Replication enables failover. The production site 106 may include a data journal copy 200*a* and meta data journal copy 300*a*.

The data journal 200*b* and meta data journal 300*b* also enable restoration of the state of LU B to an earlier point in time. The data journal 200*b* and a meta data journal 300*b* contain a history of IO transactions made to LU B because the data journal contains the Write IO data (IO D) and the meta data journal contains Write IO meta data (IO MD) as well as other meta data information including statistics meta data (STAT MD). Write IO transaction meta data generally includes the following fields: at least one identifier; a time stamp indicating the date and time at which the transaction was received by the source side DPA; the write size of the data block; the location in the journal where the data is entered; and the location in LU B where the data is to be written. The data journal includes the data of the Write IOs. During restore mode, DPA 120 reverses the Write transactions to LU B in sequence beginning with the most recent Write transaction. The reversal of the Write transactions is accomplished using the journal entries until a selected point in time is reached, thereby restoring LU B to the state at which it existed at that selected point in time. This procedure can be implemented for various other LUs such that an entire replica data set for a site can be recovered at a selected point in time.

STAT MD is used to mirror the performance information of the production site storage array on the backup site storage array. As mentioned above, performance levels are a function of storage tiering. Production site data is automatically moved between tiers over time based on IO activity. The generated STAT MD may include extent-level data access statistics and hints associated with that automatic movement of production site data. For example, STAT MD may indicate IO activity in terms of how recently an extent was accessed (Read or Write) on the production site as well as the amount of IO/sec, throughput, and various other performance statistics known to those of ordinary skill in the art. Current STAT MD is periodically transmitted to the backup site and applied as hints to the replica storage array to prompt corresponding movement of data between tiers. STAT MD is read from the production site using special commands that read statistics of the current storage and send those statistics to the backup site. Because the backup site does not journal Read IOs it uses the STAT MDs as hints to the storage array 116 to indicate Reads associated with each extent so that the backup storage array will have tiering placement similar to the production site storage array. The statistics may be collected and used on an ongoing or a periodic basis.

The journals also enable roll back of the state of LU B to include restoration of performance levels that existed at the selected earlier point in time. An historical record of STAT MD is kept in the meta data journal 300*b*. The journaled STAT MDs may be utilized in association with a checkpoint restore to provide not only the state of the data at a particular time, but also to suggest a tier at which the data was stored at that time. The statistics can be provided directly to the storage array to prompt tiering by the automatic tiering software, or used by an appliance (e.g. RecoverPoint) to calculate hints which are provided to the array to prompt placement of the data during the restore operation. Restoration of performance levels can be accomplished by applying the STAT MD entries as hints in reverse chronological order. However it should be noted that use of the statistical meta data can help restore data to an appropriate tier without stepping through every promotion and demotion of each extent of data.

Figure 4:
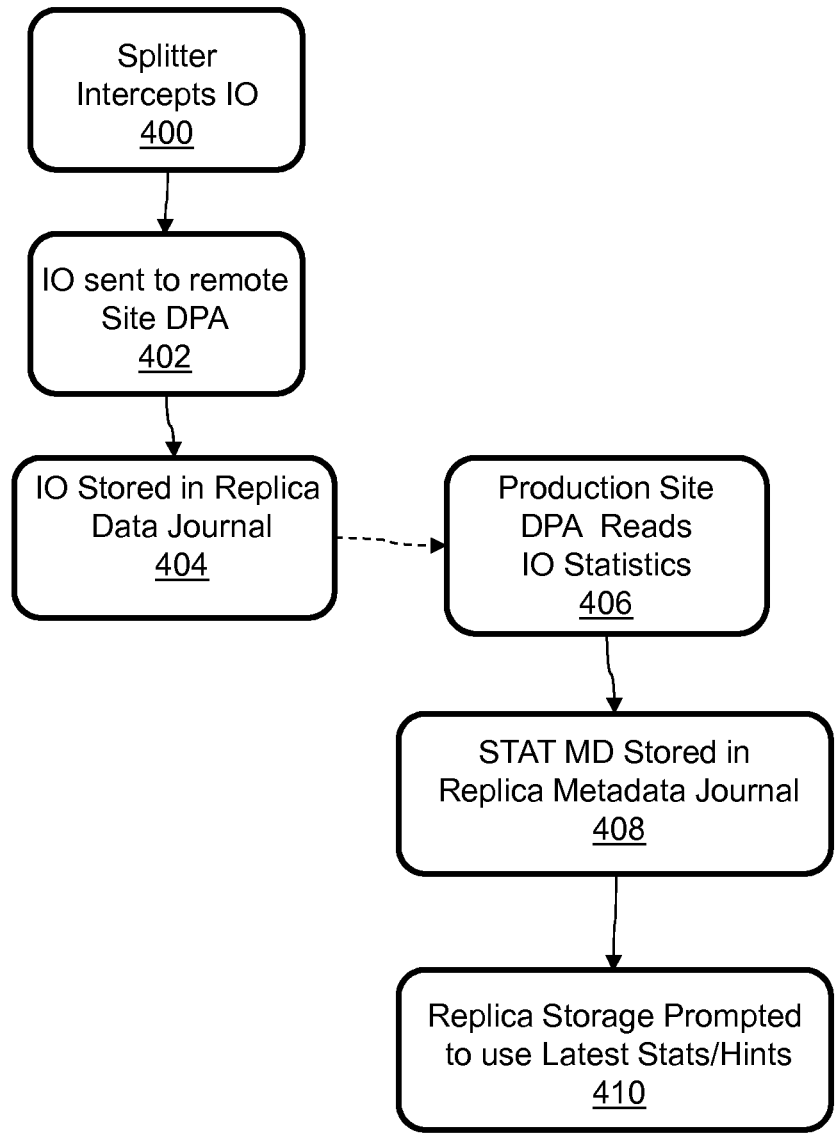
FIG. 4 illustrates normal (non-restore mode) flow steps.

FIG. 4 illustrates normal (non-restore mode) logic flow steps. After the splitter intercepts an IO as indicated in step 400, the IO is sent to the backup site DPA in step 402. Note that this may include only Write IOs, although that is not necessarily a limitation. A record of the IO is then stored in the replica data journal as indicated in step 404. That data may then be written into the replica storage array. On a periodic or ongoing basis the production site DPA reads extent-level IO activity statistics from the production site storage array as indicated in step 406. The statistics are then stored as records (STAT MDs) in the meta data journal as indicated in step 408. The replica storage system is then prompted to implement those statistics as indicated in step 410. In other words, the replica data is moved to storage tiers corresponding to the tiers on which the production data is stored at the production site. The statistical meta data may be stored in raw form, e.g., with an identifier and access time, in a refined form, e.g., as hints, or some combination thereof.

Figure 5:
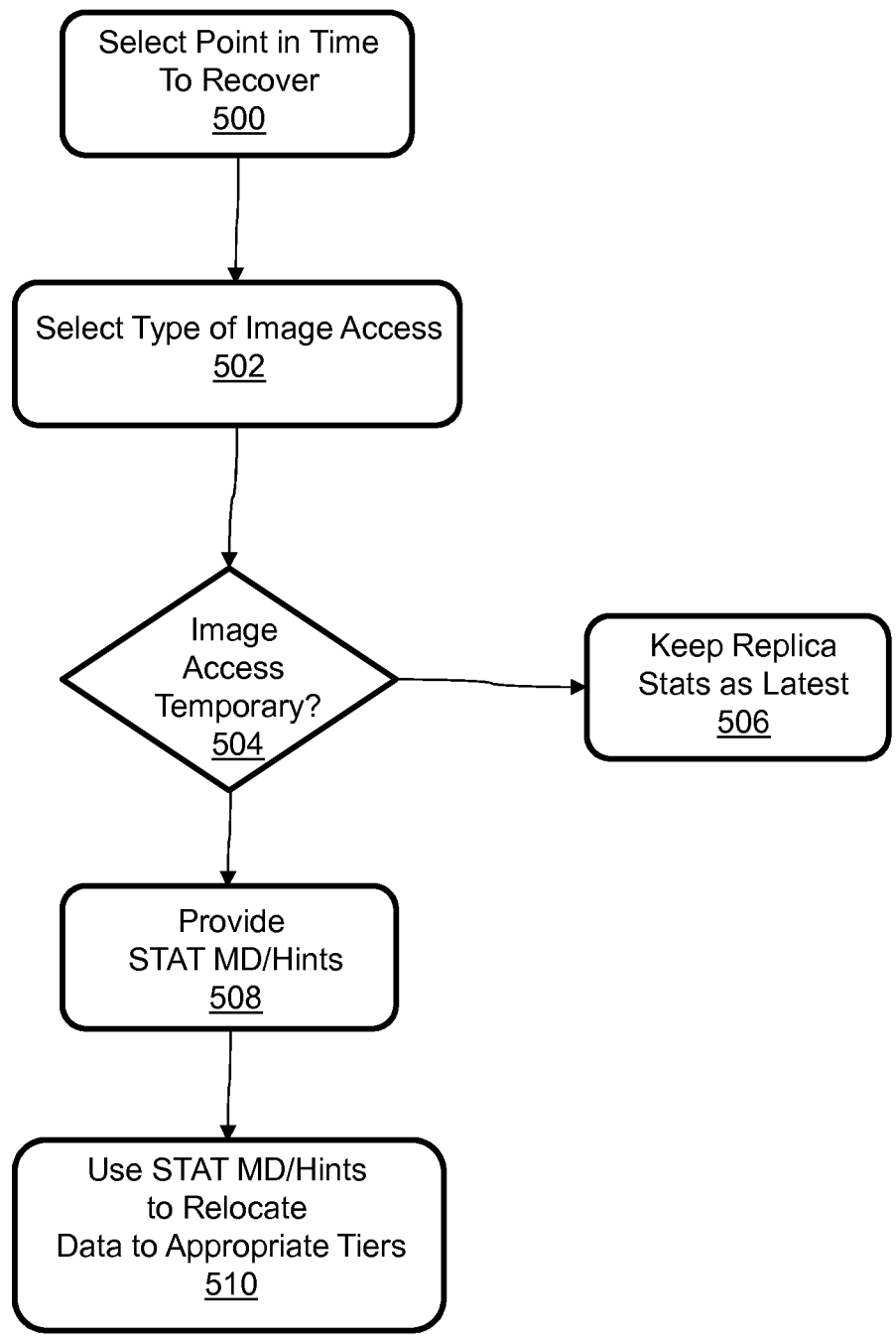
FIG. 5 illustrates restore mode flow steps.

FIG. 5 illustrates logic steps associated with a data restore mode. An initial input is to select a point in time to recover as indicated in step 500. Also inputted as indicated in step 502 is a selection of the type of image to be recovered: temporary or permanent. The type of image to be recovered might also or alternatively be inferred as indicated in step 504. For example, a failover situation would indicate a permanent type, whereas selection of a test point could indicate a temporary type of image. In the case of a temporary type of image the current replica statistics might be maintained as indicated by step 506 in order to avoid time-consuming movement of data. However, in the case of a permanent type of image recovery the statistical meta data and any available hints are provided to the restore process as indicated in step 508. As shown in step 510 the statistical meta data and hints are used to recover the performance level at the selected point in time by moving different data to the different tiers at which it was stored at that point in time. It should be noted that data may be moved between tiers by stepping back in discreet temporal steps, e.g., by implementing individual statistical meta data entries in reverse order. However, a group of statistical meta data entries might be processed together to determine the appropriate tier for each set of data being moved between tiers. It may also be desirable to determine data placement based in part on current location.

The logic processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information. The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

While the invention is described through the above exemplary examples, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures. Accordingly, the invention should not be viewed as limited except by the scope and spirit of the appended claims.

What is claimed is:

1. A method comprising:
   in a mirrored storage system including a production site with a tiered storage array and a backup site with a tiered storage array, restoring the backup site to a selected point in time by determining data state at the selected point in time, writing data indicative of that data state to the backup site storage array, and moving extents of the data written to the backup site storage array to selected tiers in order to achieve a predetermined level of performance.

2. The method of claim 1 including using statistical meta data to select a tier for each extent of data.

3. The method of claim 2 including using the statistical meta data to determine IO activity proximate to the selected point in time.

4. The method of claim 3 including calculating the statistical meta data with a backup site data protection appliance based on multiple statistics meta data entries provided from the production site.

5. The method of claim 1 including reading statistical meta data periodically from production storage array.

6. The method of claim 5 including writing the statistical meta data to a backup site meta data journal.

7. The method of claim 6 including applying the statistics as hints to the backup storage array during a normal mode of replication.

8. The method of claim 6 wherein the statistical meta data includes at least one of extent-level data access statistics and hints, and including utilizing current replica statistical meta data in association with a temporary restore operation.

9. A computer program stored on a non-transitory computer-readable medium comprising:
  in a mirrored storage system including a production site with a tiered storage array and a backup site with a tiered storage array, logic which restores the backup site to a selected point in time by determining data state at the selected point in time, writing data indicative of that data state to the backup site storage array, and moving extents of the data written to the backup site storage array to selected tiers in order to achieve a predetermined level of performance.

10. The computer program of claim 9 including logic which uses statistical meta data to select a tier for each extent of data.

11. The computer program of claim 10 including logic which uses the statistical meta data to determine IO activity proximate to the selected point in time.

12. The computer program of claim 11 including logic implemented by a backup site data protection appliance to calculate the statistical meta data based on multiple statistics meta data entries provided from the production site.

13. The computer program of claim 9 including logic which reads statistical meta data periodically from production storage array.

14. The computer program of claim 13 including logic which writes the statistical meta data to a backup site meta data journal.

15. The computer program of claim 14 including logic which applies the statistics as hints to the backup storage array during a normal mode of replication.

16. The computer program of claim 14 wherein the statistical meta data includes at least one of extent-level data access statistics and hints, and including logic which uses current replica statistical meta data in association with a temporary restore operation.

17. A mirrored storage apparatus comprising:
  a production site with a host and a tiered storage array; and
  a backup site with a host and a tiered storage array, the backup site being restored to a selected point in time by logic which determines data state at the selected point in time, writes data indicative of that data state to the backup site storage array, and moves extents of the data written to the backup site storage array to selected tiers in order to achieve a predetermined level of performance.

18. The apparatus of claim 17 including logic which uses statistical meta data to select a tier for each extent of data.

19. The apparatus of claim 18 including logic which uses the statistical meta data to determine IO activity proximate to the selected point in time.

20. The apparatus of claim 19 including logic implemented by a backup site data protection appliance to calculate the statistical meta data based on multiple statistics meta data entries provided from the production site.

* * * * *